(12) United States Patent
Geer

(10) Patent No.: US 11,137,970 B2
(45) Date of Patent: Oct. 5, 2021

(54) DIGITAL SIGNAL EXTRACTION DEVICE

(71) Applicant: Eric Geer, Fox Point, WI (US)

(72) Inventor: Eric Geer, Fox Point, WI (US)

(73) Assignee: Geerfab LLC, Fox Point, WI (US)

( * ) Notice: Subject to any disclaimer, the term of this patent is extended or adjusted under 35 U.S.C. 154(b) by 0 days.

(21) Appl. No.: 16/845,537

(22) Filed: Apr. 10, 2020

(65) Prior Publication Data
US 2020/0326904 A1 Oct. 15, 2020

Related U.S. Application Data

(60) Provisional application No. 62/832,146, filed on Apr. 10, 2019.

(51) Int. Cl.
*G06F 3/16* (2006.01)
(52) U.S. Cl.
CPC .................................. *G06F 3/162* (2013.01)
(58) Field of Classification Search
CPC .................................. G06F 3/162; G06F 3/165
See application file for complete search history.

(56) References Cited

U.S. PATENT DOCUMENTS

2008/0025707 A1* 1/2008 Sawada ............ H04N 21/44231
386/248
2012/0294462 A1* 11/2012 Morey ..................... H04R 5/02
381/119

OTHER PUBLICATIONS

The 10th Anniversary of Baiyun: A unique creative product—HDMI2DSD digital audio interface, Baiyun Audio, Published Mar. 26, 2019 on http://www.hifi168.com/bbs/showtopic-249820.aspx (citations from translate.google.com), pp. 1-12. (Year: 2019).*
Kanexpro, Haecoax Set Up Guide.
Explore, Generic MCU with 64K Embedded Iash User Guide EPF011A/EPF011C/EPF011D User Guide V0.2 Revised Nov. 7, 2007.

* cited by examiner

*Primary Examiner* — Joseph Saunders, Jr.
(74) *Attorney, Agent, or Firm* — Reinhart Boerner Van Deuren P.C.

(57) ABSTRACT

A digital signal extraction device that includes an input configured to receive a digital audio input signal from an audio media player, an output configured to provide high-resolution digital audio output to an external digital-to-analog converter (DAC), and a microprocessor coupled between the input and output. The microprocessor is configured to extract the high-resolution digital audio output from the digital audio input signal received at the input, while keeping intact any copy protection for the digital audio input signal.

18 Claims, 3 Drawing Sheets

DIGITAL SIGNAL EXTRACTION DEVICE

CROSS-REFERENCE TO RELATED PATENT APPLICATIONS

This patent application claims the benefit of U.S. Provisional Patent Application No. 62/832,146, filed Apr. 10, 2019, the entire teachings and disclosure of which are incorporated herein by reference thereto.

FIELD OF THE INVENTION

This invention generally relates to a digital signal extraction device.

BACKGROUND OF THE INVENTION

High-resolution audio, also known as high-definition audio or HD audio, is a term used by some in the recorded-music industry and by high-fidelity sound reproduction equipment vendors. It generally refers to audio with a higher than 44.1 kHz sampling rate and/or higher than 16-bit linear bit depth. Typically, it refers to audio with sampling rates of 96 kHz (or higher), sometimes informally written as "96 k". High-resolution audio may be delivered through multiple formats, such as SACD, Blu-ray Audio, HRx, etc. The increase in the bit depth from 16 to 24 is/was the first step toward high-resolution audio.

Super Audio CD (SACD) is a read-only optical disc for audio storage that was introduced in 1999. There is an ongoing market for SACDs, as compared to CD's, which mainly serves the audiophile community. Typically, SACD players include an internal digital-to-analog converter that processes the audio signal before sending it to a preamp/amp/speaker. However, the internal DACs used in SACD players are not considered to be of the same quality as many of the standalone DACs on the market. As a result, audiophiles will often send the output from an SACD player to an external standalone DAC to get a higher quality sound. Standalone digital-to-analog converters (DACs) have been on the market since the early 1980's, or about 40 years.

HRx provides high resolution audio WAV files on a DVD-R data disc. Audio content in the HRx format is 24-bit at a 176.4 kHz sampling rate. Often, computers are used to output HRx audio content to an amplifier and speaker, though some media players have been made to play HRx audio discs.

The media (i.e., optical discs) used in SACD, Blu-ray Audio, and universal players generally includes certain copy protection features or other limitations, which make the high-resolution digital content of the optical discs difficult to copy, even though the audio may be copyable is some form having less than high-resolution quality. These same copy protection features may also serve to prevent users from sending the high-resolution audio to an external standalone DAC.

Thus, there is a need for a device which can extract high-resolution audio from SACD, Blu-ray Audio and universal players, so the high-resolution audio can be provided to the external standalone DAC, with the copy protection intact.

Embodiments of the invention provide such a device. These and other advantages of the invention, as well as additional inventive features, will be apparent from the description of the invention provided herein.

BRIEF SUMMARY OF THE INVENTION

In one aspect, embodiments of the invention provide digital signal extraction device that includes an input configured to receive a digital audio input signal from an audio media player, an output configured to provide high-resolution digital audio output to an external digital-to-analog converter (DAC), and a microprocessor coupled between the input and output. The microprocessor is configured to extract the high-resolution digital audio output from the digital audio input signal received at the input, while keeping intact any copy protection for the digital audio input signal.

In particular embodiments, the high-resolution audio includes DSD64 audio signals. In more particular embodiments, the high-resolution audio includes PCM audio signals. The input for the digital signal extraction device may be an HDMI input. Furthermore, in certain embodiments, the output is one of an S/PDIF coaxial output and a Toslink optical output.

In a further embodiment, the input is configured to receive the audio signal from one of an SACD player, a Blu-ray Audio player, and a universal player. The digital signal extraction device may include a 12-volt DC input to allow users to power the device with a battery or similarly suitable DC power source, and may also include an HDMI output to provide video and possible audio output to a video monitor or television.

In another aspect, embodiments of the invention provide a method of digital signal extraction that includes the steps of receiving a digital audio input signal from an audio source, extracting DSD64 audio from the digital audio input signal, and routing the DSD64 audio to a first output configured to provide the DSD64 audio to an external DAC. The method may also include extracting PCM audio from the digital audio input signal, and routing the PCM audio to a first output configured to provide the PCM audio to an external DAC.

In some embodiments, the method calls for routing the DSD64 audio or PCM audio to one of an S/PDIF coaxial output and a Toslink optical output. Further, the method may include receiving the digital audio input signal from one of an SACD player, a Blu-ray Audio player, and a universal player. Embodiments of the method may further include extracting DSD64 audio from the digital audio input signal while keeping any copy protection for the digital audio input signal intact.

In other embodiments, the method calls for routing a video component of the digital audio input signal to an HDMI output. Furthermore, embodiments of the method may call for receiving the digital audio input signal via an HDMI input.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Many high-resolution audio media players use HDMI outputs to route the audio and video signals to surround-sound receiver. However, most conventional standalone DACs do not have HDMI inputs, meaning that while a user may be able to send lower quality audio to the standalone DAC, that user cannot send the high-resolution audio from the HDMI output to the standalone DAC. Instead, most standalone DACs have S/PDIF inputs where the signal is provided to the DAC via coaxial cable. In the context of this application, "high-resolution audio" is defined as audio in DSD64 or in PCM with a 24-bit audio depth and a sampling rate of at least 48 kHz. DSD64 is defined as audio with 64 times the resolution of the compact disc PCM format of 16-bit/44.1 kHz. Conventional media players may also include USB ports. However, transmitting audio via USB ports tends to strip the copy protection from the audio being transmitted.

SACD audio is typically stored and transmitted in the direct stream digital (DSD) format, which differs from the conventional pulse-code modulation (PCM) used by the compact disc or conventional computer audio systems. Pulse-code modulation (PCM) is a method used to digitally represent sampled analog signals. It is the standard form of digital audio in computers, compact discs, digital telephony and other digital audio applications. In a PCM stream, the amplitude of the analog signal is sampled regularly at uniform intervals, and each sample is quantized to the nearest value within a range of digital steps. Common sampling frequencies in PCM systems are 48 kHz as used with DVD format videos, or 44.1 kHz as used in Compact discs. Sampling frequencies of 96 kHz or 192 kHz are often used on some of the high-resolution audio equipment referenced above.

DSD uses pulse-density modulation encoding—a technology to store audio signals on digital storage media which are used for the SACD. The signal is stored as delta-sigma modulated digital audio, a sequence of single-bit values at a sampling rate of 2.8224 MHz (i.e., 64 times the CD audio sampling rate of 44.1 kHz, but only at $1/32768$ of its 16-bit resolution). There are higher forms of DSD (up to DSD1024) and PCM (up to 32-bit/768 kHz), but not currently on optical discs.

Figure 1:
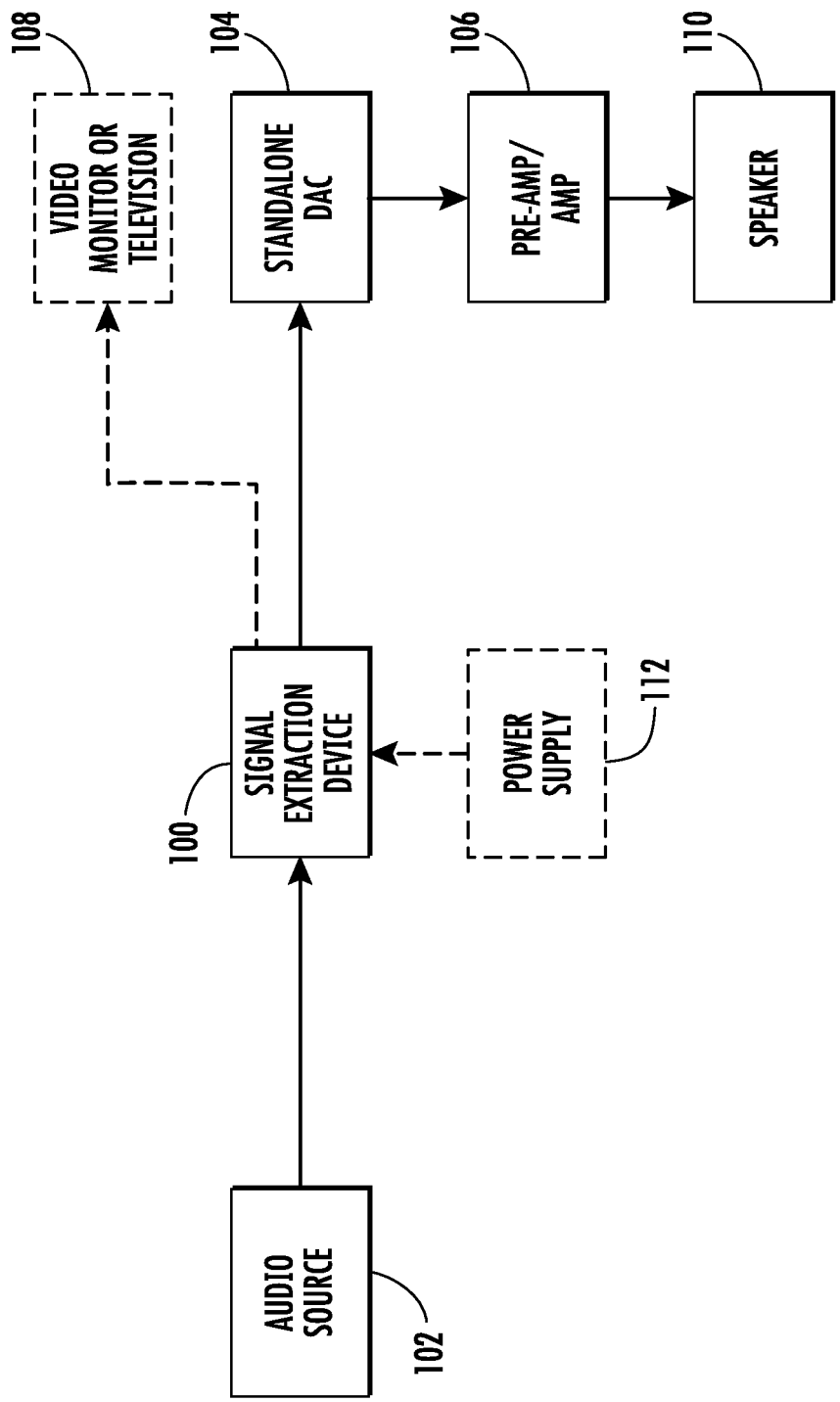
FIG. 1 is a block diagram illustrating a system incorporating a digital signal extraction device, constructed in accordance with an embodiment of the invention.

FIG. 1 shows a block diagram of an audio system incorporating a digital signal extraction device 100, in accordance with an embodiment of the invention. Described herein are embodiments of the digital signal extraction device 100 which is capable of extracting a high-resolution audio signal from a lower quality audio output, such as that output by the S/PDIF coaxial output, for example, from an audio source 102 such as a high-resolution audio media player, e.g., an SACD, Blu-ray Audio and/or universal players.

The signal extracted by the digital signal extraction device 100 is output to an external standalone digital-to-analog converter (DAC) 104. In the embodiment of FIG. 1, the output of the standalone DAC 104 goes to a preamplifier and then to an amplifier, or simply to an integrated amplifier 106. The output of amplifier 106 goes to a speaker 110. If the signal input to the digital signal extraction device 100 includes a video component, that component can be forwarded In a particular embodiment, the digital signal extraction device 100, extracts a high-resolution DSD64 signal, or a PCM signal up to 24 bits at a 192 kHz sampling rate, from an HDMI data stream output from the HDMI output of the audio media player 102. In some applications, the audio signal will be accompanied by a video signal. The video signal is passed along without change while the audio signal is processed in the manner described below. In a specific embodiment, the digital signal extraction device 100 is configured to output the high-resolution DSD64 signal from the SACD, Blu-ray Audio and/or universal player 102, via the DSD over PCM (DoP) protocol, through an output such as S/PDIF Coaxial and Toslink Optical outputs to an external standalone DAC 104.

In certain embodiments, the digital signal extraction device 100 includes an HDMI pass-through for player menu settings, Blu-ray menu access and other video uses. The HDMI output may be connected to a TV or video monitor 108 to facilitate operation of the extraction device 100 via remote. It is recognized that embodiments of the digital signal extraction device 100 include a USB or mini-USB connection that is provided for firmware updates to the signal extraction device 100. Additionally, while typical embodiments of the digital signal extraction device 100 will have a plug for power supplied from the grid, some embodiments of the digital signal extraction device 100 will also include an optional DC 12-volt input for users that would like to run the device via a battery power supply 112, or by converting AC power to DC power.

Thus, it can be seen that the digital signal extraction device 100 is configured to extract a DSD64 signal, and optionally a PCM signal, from an SACD or Blu-ray Audio disc source signal, and to make the DSD64 and PCM output signals available to external digital-to-analog converters 104 (DACs) using the DoP protocol (DSD over PCM). In certain embodiments, the digital signal extraction device 100 provides extracted audio signals via S/PDIF coaxial and Toslink outputs, all the while keeping the HDCP copy protection intact. In typical embodiments, the signal extraction device 100 does not use a USB output, as that would strip the HDCP copy protection. Thus, embodiments of the digital signal extraction device 100 can provide a combination of high-resolution DSD64 and PCM extraction, while maintaining copy protection.

As stated above, many SACD, Blu-ray Audio, and universal players 102 include certain copy protection features or other limitations, which make the high-resolution digital content of players difficult to copy. As referenced above, one type of copy protection is known as High-Bandwidth Digital Content Protection (HDCP). HDCP is designed to eliminate the possibility of intercepting digital data midstream between the source and the external digital-to-analog converter. As also stated above, these players may allow for audio to be copied in some form having less than high-resolution quality. Additionally, these copy protection features may also serve to prevent users from sending the high-resolution audio to an external standalone DAC. As also referenced above, certain embodiments of the digital signal extraction device 100 include a feature that keeps the HDCP intact while extracting the DSD64 and PCM signals.

Figure 2:
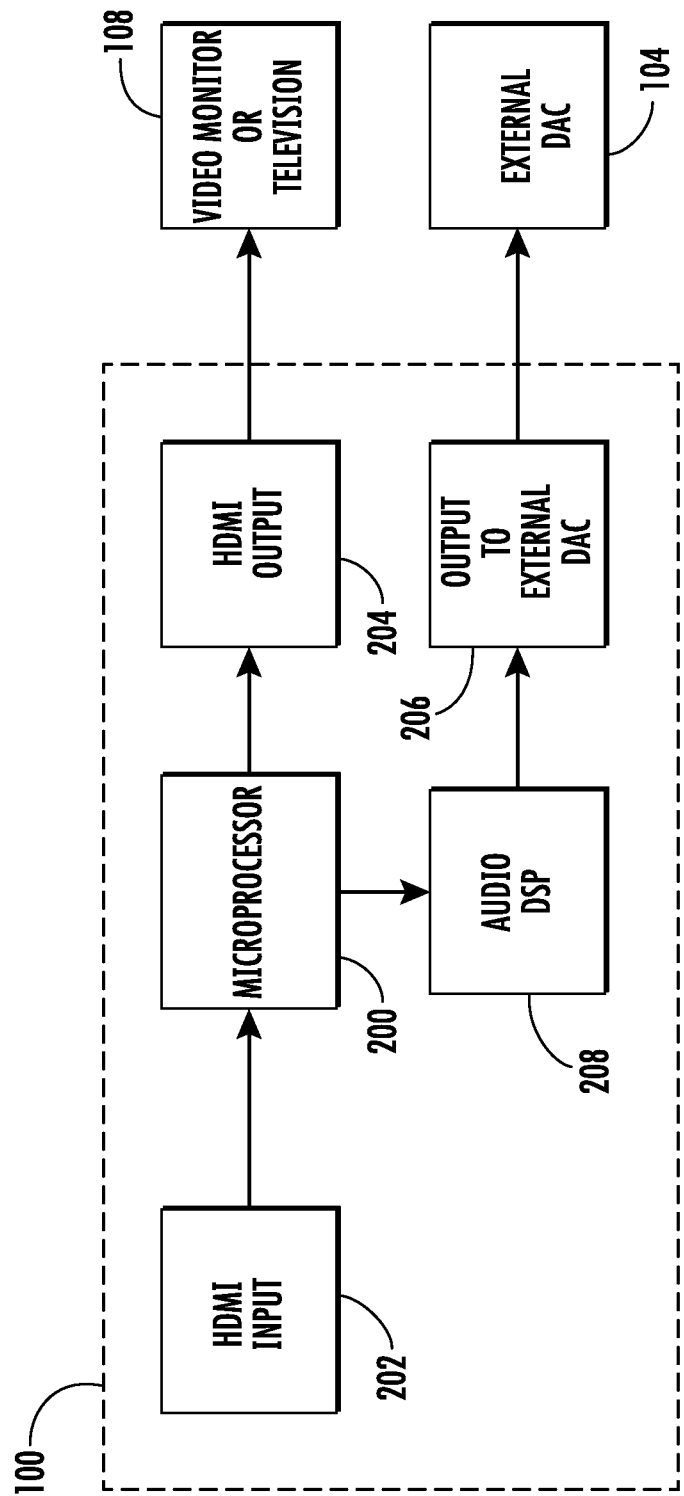
FIG. 2 is a schematic block diagram of the digital signal extraction device, according to an embodiment of the invention.

FIG. 2. is a schematic block diagram of the digital signal extraction device 100, according to an embodiment of the invention. The digital signal extraction device 100 includes at least the components shown inside the broken lines of FIG. 2. The digital signal extraction is performed by a microprocessor 200 specially configured for this task, such that multi-channel and/or stereo audio from an input module 202 can be extracted by the microprocessor 200 and sent to an audio output port. In this embodiment, the microprocessor 200 receives an audio signal input via input module 202. In the embodiment shown, the input is an HDMI input. However, the invention is not limited to this input type. If the audio input to the microprocessor 200 includes a video component, that component, and optionally any unextracted portions of the audio signal, are routed to a first output 204. The first output 204 is configured to connect to a video monitor or television 108.

The microprocessor 200 routes the extracted DSD64 and PCM signals to an audio digital signal processor 208 which processes the signal before sending it to second output 206. In certain embodiments, the second output 206 includes one or both of S/PDIF Coaxial and Toslink Optical outputs. The second output 206 is configured to connect to the standalone DAC 104.

Figure 3:
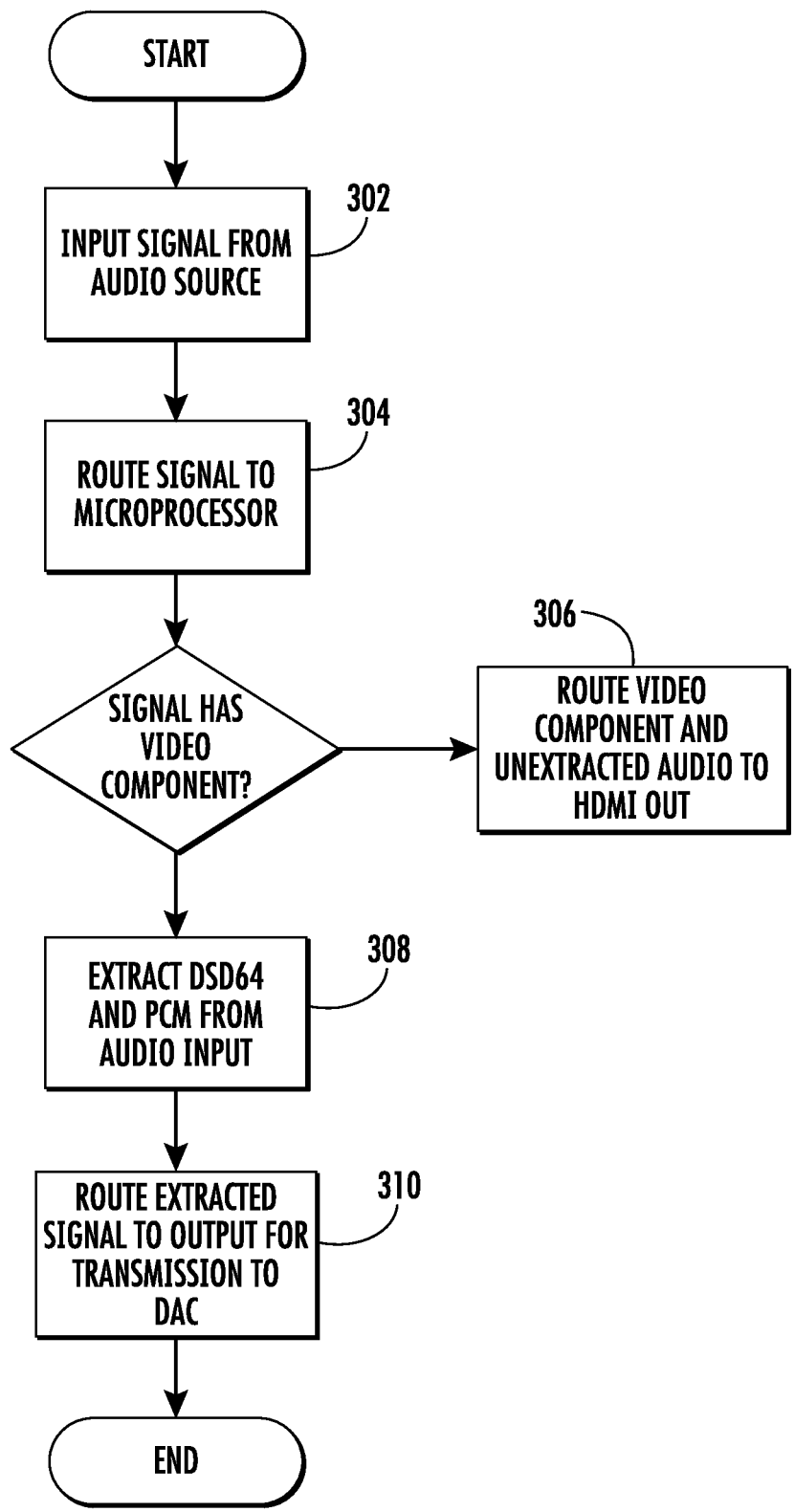
FIG. 3 is a flowchart showing a process for digital signal extraction in accordance with an embodiment of the invention.

FIG. 3 is a flowchart showing a process for digital signal extraction. In the first step 302, the high-resolution audio and video data from the audio source 102, such as the aforementioned SACD, Blu-ray Audio, and universal player is transmitted through a single HDMI cable into the HDMI input. In the second step 304, the audio signal from the audio source 102 is sent to the microprocessor 200.

In some cases, the audio signal will be transmitted in combination with a video signal. In such a case, in the third step 306, the video data and any unextracted portions of the high-resolution audio signal is routed directly to an output (e.g., the HDMI output) which is connected to an external monitor or television.

In the fourth step 308, the digital audio input signal goes through an extraction process in which the microprocessor 200 extracts DSD64 audio signals routed from the audio input 202. The microprocessor 200 may also extract PCM audio signals in addition to the DSD64 signals. In the fifth step 310, the extracted signals are sent to the output 206 (e.g., S/PDIF Coax Out and Toslink Optical Out) for transmission to the standalone DAC 104. Typically, the PCM signal is up to 24-bit/192 kHz and the DSD64 as DoP. Toslink supports up to 24-bit/176.4 kHz PCM, can output 24-bit/192 kHz, but is not part of the spec, as sometimes cables will cause it to stumble.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A digital signal extraction device comprising:
   an input configured to receive a digital audio input signal from an audio media player;
   an output configured to provide high-resolution digital audio output to an external digital-to-analog converter (DAC); and
   a microprocessor coupled between the input and output, the microprocessor configured to extract the high-resolution digital audio output from the digital audio input signal received at the input, while keeping intact any copy protection for the digital audio input signal.

2. The digital signal extraction device of claim 1, wherein the high-resolution audio includes DSD64 audio signals.

3. The digital signal extraction device of claim 2, wherein the high-resolution audio includes PCM audio signals.

4. The digital signal extraction device of claim 1, wherein the input is an HDMI input.

5. The digital signal extraction device of claim 1, wherein the output is one of an S/PDIF coaxial output and a Toslink optical output.

6. The digital signal extraction device of claim 1, wherein the input is configured to receive the audio signal from one of an SACD player, a Blu-ray Audio player, and a universal player.

7. The digital signal extraction device of claim 1, further comprising a 12-volt DC input.

8. The digital signal extraction device of claim 1, further comprising an HDMI output.

9. The digital signal extraction device of claim 1, wherein the copy protection is high-bandwidth digital content protection (HDCP).

10. The digital signal extraction device of claim 1, wherein the output is a Toslink optical output.

11. A method of digital signal extraction, comprising the steps of:
    receiving a digital audio input signal from an audio source;
    extracting DSD64 audio from the digital audio input signal while keeping any copy protection for the digital audio input signal intact;
    routing the DSD64 audio to a first output configured to provide the DSD64 audio to an external DAC.

12. The method of claim 11, further comprising the steps of:
extracting PCM audio from the digital audio input signal;
routing the PCM audio to a first output configured to provide the PCM audio to an external DAC.

13. The method of claim 11, wherein routing the DSD64 audio or the PCM audio to the first output comprises routing the DSD64 audio or PCM audio to one of an S/PDIF coaxial output and a Toslink optical output.

14. The method of claim 11, wherein receiving the digital audio input signal from the audio source comprises receiving the digital audio input signal from one of an SACD player, a Blu-ray Audio player, and a universal player.

15. The method of claim 11, further comprising the step of routing a video component of the digital audio input signal to an HDMI output.

16. The method of claim 11, wherein receiving the digital audio input signal comprises receiving the digital audio input signal via an HDMI input.

17. The method of claim 11, wherein extracting DSD64 audio from the digital audio input signal while keeping any copy protection for the digital audio input signal intact comprises extracting DSD64 audio from the digital audio input signal while keeping high-bandwidth digital content protection (HDCP) for the digital audio input signal intact.

18. The method of claim 11, wherein routing the DSD64 audio or the PCM audio to the first output comprises routing the DSD64 audio or PCM audio to a Toslink optical output.

\* \* \* \* \*